(12) United States Patent
Ovsyannikov et al.

(10) Patent No.: US 10,034,013 B2
(45) Date of Patent: Jul. 24, 2018

(54) RECOVERING MOTION VECTORS FROM LOST SPATIAL SCALABILITY LAYERS

(71) Applicant: Intel Corporation, Santa Clara, CA (US)

(72) Inventors: Eugeniy P. Ovsyannikov, Saint-Petersburg (RU); Sergey E. Petrov, Saint-Petersburg (RU); Boris D. Kudryashov, Saint-Petersburg (RU)

(73) Assignee: Intel Corporation, Santa Clara, CA (US)

(*) Notice: Subject to any disclaimer, the term of this patent is extended or adjusted under 35 U.S.C. 154(b) by 415 days.

(21) Appl. No.: 13/996,001

(22) PCT Filed: Dec. 5, 2012

(86) PCT No.: PCT/RU2012/001020
§ 371 (c)(1),
(2) Date: Jun. 20, 2013

(87) PCT Pub. No.: WO2014/088446
PCT Pub. Date: Jun. 12, 2014

(65) Prior Publication Data
US 2015/0049812 A1 Feb. 19, 2015

(51) Int. Cl.
*H04N 7/12* (2006.01)
*H04N 19/44* (2014.01)
(Continued)

(52) U.S. Cl.
CPC ......... *H04N 19/513* (2014.11); *H04L 65/607* (2013.01); *H04N 19/33* (2014.11);
(Continued)

(58) Field of Classification Search
CPC ...... H04L 65/607; H04N 19/33; H04N 19/44; H04N 19/51; H04N 19/513; H04N 19/59; H04N 19/895
(Continued)

(56) References Cited

U.S. PATENT DOCUMENTS

2005/0135477 A1 6/2005 Zhang et al.
2007/0211798 A1* 9/2007 Boyce .................. H04N 19/61
375/240.16
(Continued)

FOREIGN PATENT DOCUMENTS

CN 1939066 A 3/2007
CN 101401432 A 4/2009
(Continued)

OTHER PUBLICATIONS

International Search Report and Written Opinion received for PCT Patent Application No. PCT/RU2012/001020, dated Sep. 12, 2013, 6 pages.
(Continued)

*Primary Examiner* — Jessica M Prince
(74) *Attorney, Agent, or Firm* — Jordan IP Law, LLC

(57) ABSTRACT

Methods and systems may provide for receiving a decoded enhancement layer of a video bitstream, wherein the decoded enhancement layer is associated with a previous layer of the video bitstream, and wherein the previous layer is undecoded due to a packet loss condition with respect to the video bitstream. Additionally, an intermediate motion vector of the previous layer may be estimated, and a target motion vector of the decoded enhancement layer may be estimated based on the intermediate motion vector. In one example, an upsample output gate is maintained in a closed state until the target motion vector has been estimated.

22 Claims, 5 Drawing Sheets

(51) Int. Cl.
*H04N 19/513* (2014.01)
*H04N 19/51* (2014.01)
*H04N 19/33* (2014.01)
*H04N 19/895* (2014.01)
*H04N 19/59* (2014.01)
*H04L 29/06* (2006.01)

(52) U.S. Cl.
CPC ............ *H04N 19/44* (2014.11); *H04N 19/51* (2014.11); *H04N 19/59* (2014.11); *H04N 19/895* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2009/0138773 | A1* | 5/2009 | Henocq | H04N 19/30 714/746 |
| 2009/0141790 | A1* | 6/2009 | Kawashima | G10L 19/24 375/240 |
| 2009/0175333 | A1 | 7/2009 | Hsiang | |
| 2009/0207916 | A1 | 8/2009 | Kao | |
| 2009/0220004 | A1* | 9/2009 | Cieplinski | H04N 19/593 375/240.16 |
| 2010/0165077 | A1 | 7/2010 | Yin | |
| 2011/0122945 | A1* | 5/2011 | Li | H04N 19/00321 375/240.12 |

FOREIGN PATENT DOCUMENTS

| | | |
|---|---|---|
| EP | 1711018 A1 | 10/2006 |
| RU | 2 409 006 C1 | 10/2011 |
| TW | I233306 B | 5/2005 |
| TW | 200707326 A | 2/2007 |
| TW | 200718074 A | 5/2007 |
| WO | 2011136575 A2 | 11/2011 |

OTHER PUBLICATIONS

Office Action for Chinese Application No. 201280076863.6, dated Jul. 3, 2017, 8 pages.
Search Report for Taiwanese Patent Application No. 102141920, dated Oct. 17, 2016, 2 pages including 1 page of English translation.

* cited by examiner

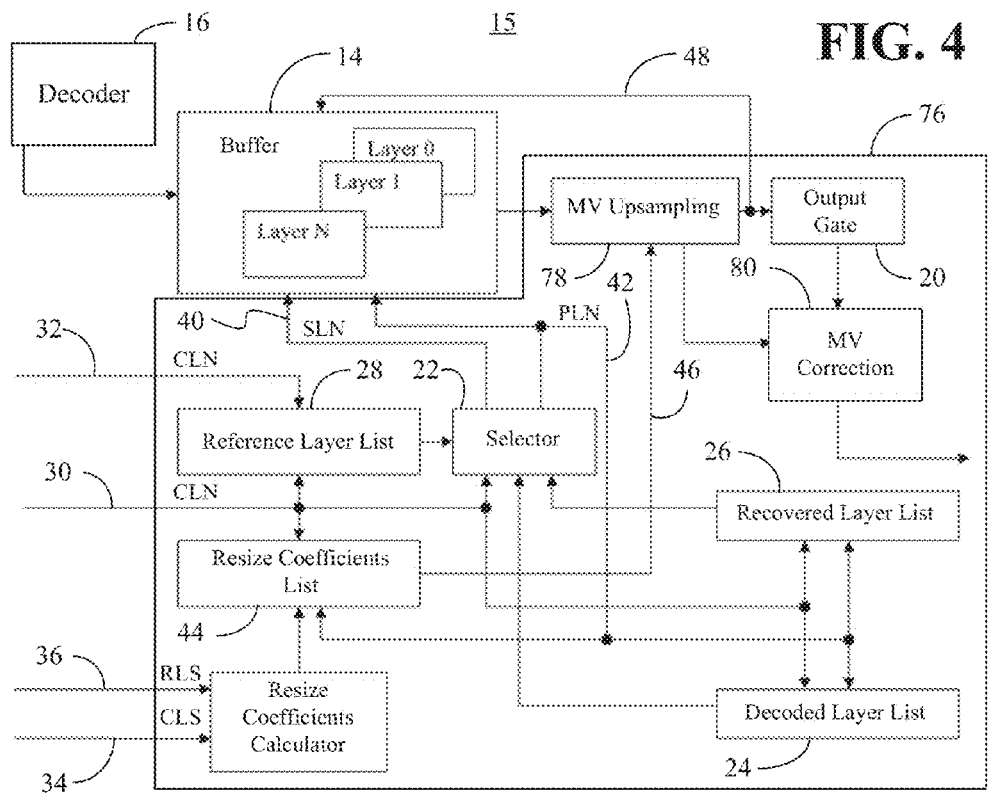
FIG. 4
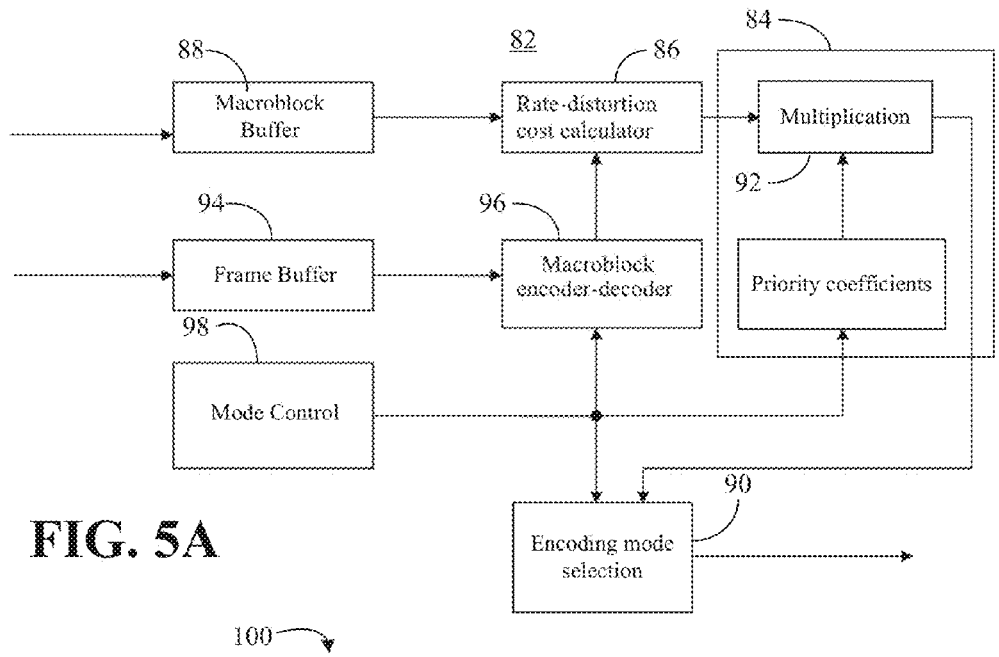
FIG. 5A
FIG. 5B

RECOVERING MOTION VECTORS FROM LOST SPATIAL SCALABILITY LAYERS

BACKGROUND

Video bitstreams that support "spatial scalability" may be encoded as a base layer and a set of enhancement layers, with each enhancement layer facilitating the synthesis of a higher quality/resolution frame for display. Synthesizing a given enhancement layer may involve the use of motion vector data from a previous (e.g., reference) layer in the set, wherein motion vectors may be commonly used to track inter-frame motion within video and burst captured still images. Communication networks, however, may often cause video bitstreams to suffer from packet losses due to channel bandwidth limitations, channel noise, and so forth. If a reference layer is lost due to such a packet loss condition, any subsequent layers relying on the motion vector data from that layer may be disregarded in conventional decoding solutions. As a result, only the last successfully received layer can be used to synthesize the output frame. While the synthesized frame may be upsampled to achieve the target resolution/size, such an approach may lead to blurry results that are missing small details.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a block diagram of an example of a recovery module having motion vector correction logic according to an embodiment;

FIG. 5A is a block diagram of an encoding mode prioritization module according to an embodiment;

FIG. 5B is a flowchart of an example of a method of selecting encoding modes according to an embodiment;

DETAILED DESCRIPTION

Embodiments may include an apparatus having a buffer to receive a decoded enhancement layer of a bitstream, wherein the decoded enhancement layer is to be associated with a previous layer of the video bitstream, and wherein the previous layer is to be undecoded due to a packet loss condition with respect to the video bitstream. The apparatus may also have a recovery module to estimate an intermediate motion vector of the previous layer, and to estimate a target motion vector of the decoded enhancement layer based on the intermediate motion vector.

Embodiments can also include a system having a network controller to obtain a video bitstream and a decoder to generate a decoded enhancement layer based on the video bitstream, The system may also have a buffer to receive the decoded enhancement layer, wherein the decoded enhancement layer is to be associated with a previous layer of the video bitstream, and wherein the previous layer is to be undecoded due to a packet loss condition with respect to the video bitstream. The system may also have a recovery module to estimate an intermediate motion vector of the previous layer and estimate a target motion vector of the decoded enhancement layer based on the intermediate motion vector.

Embodiments may also include a method in which a decoded enhancement layer of a video bitstream is received, wherein the decoded enhancement layer is associated with a previous layer of the video bitstream, and wherein the previous layer is undecoded due to a packet loss condition with respect to the video bitstream. Additionally, a list architecture may be maintained, wherein the list architecture includes one or more of a decoded layer list, a recovered layer list and a reference layer list. The method can also provide for estimating an intermediate motion vector of the previous layer based on a decoded base layer of the video bitstream and the list architecture, and estimating a target motion vector for the decoded enhancement layer based on the intermediate motion vector and the list architecture. Moreover, the method may include labeling a macroblock associated with the target motion vector in a reliability map as unreliable.

Embodiments may also include a computer readable storage medium having a set of instructions which, if executed by a processor, cause a computer to identify a macroblock associated with a video bitstream, and select an encoding mode for the macroblock based on an expected recovery error with respect to one or more motion vectors in the macroblock.

Figure 1:
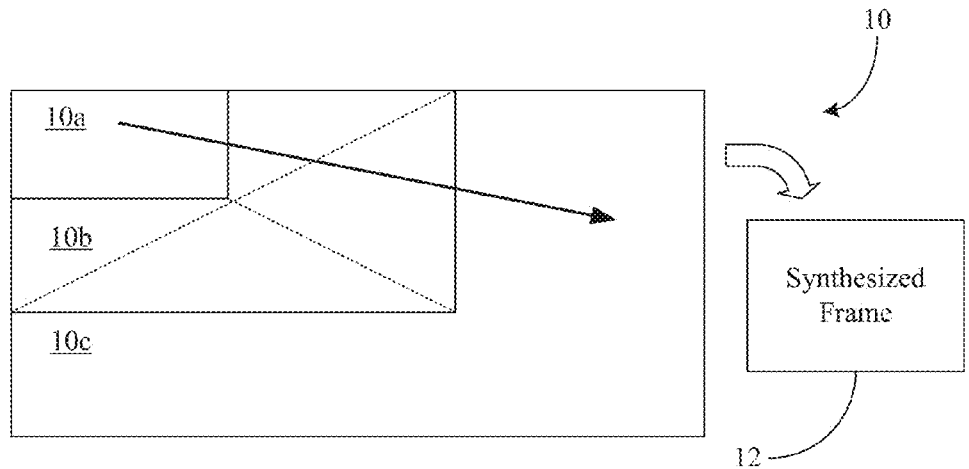
FIG. 1 is a block diagram of an example of a plurality of layers according to an embodiment.

Turning now to FIG. 1, a plurality of layers 10 (10a-10c) is shown, wherein the layers 10 may generally correspond to different frame resolutions/sizes of a video bitstream. Layers corresponding to larger frame sizes may be useful in scaling the video bitstream for display on larger and/or higher resolution display devices. More particularly, a base layer 10a might have a frame size of 320×180 pixels, whereas a first enhancement layer 10b may have a frame size of 640×360 pixels and a second enhancement layer 10c may have a frame size of 1280×720 pixels. Thus, the second enhancement layer 10c might be particularly useful for display of the video bitstream on a 720p HD (high definition) display device. The first enhancement layer 10b, on the other hand, may be more suitable for display of the video bitstream on a lower resolution (e.g., SD/standard definition) display device.

As will be discussed in greater detail, techniques described herein may provide for automatically recovering motion vectors of layers that are lost during transmission, using the recovered motion vectors to recover motion vectors for subsequent layers, as well as using the recovered motion vectors to synthesize high quality frames. Thus, in the illustrated example, although the first enhancement layer 10b is lost (e.g., not decoded), the second enhancement layer 10c may still be used to synthesize a frame 12 that has a size corresponding to the second enhancement layer 10c (e.g., 1280×720 pixels) rather than the base layer 10a (e.g., 320×180 pixels), which would be considered the last successfully received layer under conventional approaches. More particularly, one or more intermediate motion vectors can be estimated for the undecoded first enhancement layer 10b based on the decoded base layer 10a, and one or more target motion vectors may be estimated for the decoded second enhancement layer 10c based on the intermediate motion vectors of the first enhancement layer 10b. Such an approach may obviate any need to upsample the synthesized frame 12 and can provide substantial improvements in video quality.

Figure 2:
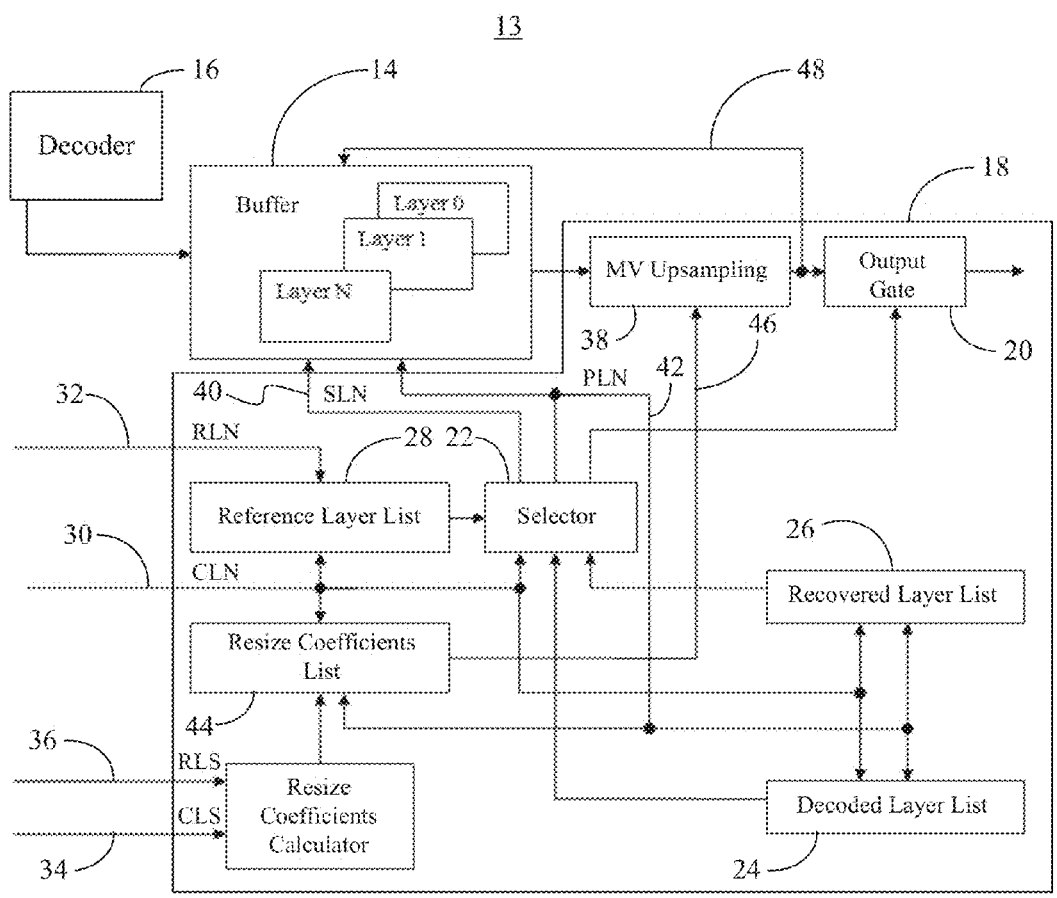
FIG. 2 is a block diagram of an example of a recovery module according to an embodiment.

FIG. 2 shows a logic architecture 13 having a decoder 16, a buffer 14 and a recovery module 18. In general, the decoder 16 may decode layers of a video bitstream, wherein the buffer 114 may receive the decoded layers from the decoder 16 for subsequent processing by the recovery module 18. As already noted, one or more layers of the video bitstream may be undecoded due to a packet loss condition such as channel bandwidth limitations, channel noise, etc. The recovery module 18 can use an upsample module 38 to estimate intermediate motion vectors of lost layers, and estimate target motion vectors of subsequent decoded enhancement layers based on the intermediate motion vectors. In this regard, the illustrated recovery module 18 includes an upsample output gate 20 and a selector 22 that maintains the upsample output gate in a closed state until the target motion vectors have been estimated.

More particularly, the recovery module 18 may maintain a list architecture that includes a decoded layer list 24, a recovered layer list 26, and a reference layer list 28, wherein the list architecture may be used to estimate the intermediate and target motion vectors. For example, the inputs to the logic architecture 13 may include the decoded data, including motion vectors (if applicable), from the decoder 16, a current layer number ("CLN") on line 30, a reference layer number ("RLN") on line 32, a current layer size ("CLS") on line 34, and reference layer size ("RLS") on line 36. The CLN and CLS may correspond to the layer that is currently being presented from the decoder 16, wherein the RLN and the RLS may correspond to the layer referenced by the current layer (e.g., a previous layer).

By way of example, if the video bitstream contains four layers (i.e., base layer L0 and enhancement layers L1-L3) and each enhancement layer uses the immediately preceding layer as a reference layer, the motion vectors of layer L0 would be used to determine the motion vectors of layer L1, the motion vectors of layer L1 would be used to determine the motion vectors of layer L2, and so on. Furthermore, if layers L0, L1 and L2 are successfully received and decoded, the decoded layer list 24 would be populated with the values L0, L1 and L2 (or simply zero, one and two) In order to receive and decode layer L3, the RLN may be determined from the decoded data as being L2, wherein the value L2 (or simply two) may be stored in the reference layer list 28.

Since layer L2 is identified in the decoded layer list 24, the selector 22 may designate layer L2 as a supporting layer. In such a case, the value L2 (or simply two) may be transmitted as a supporting layer number ("SUN") on line 40 to the buffer 14. Additionally, the selector 22 may designate the layer L3 as a processed layer by transmitting the value L3 (or simply three) as a processed layer number ("PLN") on line 42. The PLN line 42 feeds the buffer 14, the decoded layer list 24, the recovered layer list 26, and a resize coefficients list 44, in the illustrated example. Thus, the upsample module 38 may obtain coefficients (e.g., Xcoeff, Ycoeff) corresponding to the motion vectors of the layer L2 on line 46 from the resize coefficients list 44 and use those coefficients to interpolate the motion vectors of the layer L3. Since the PLN in this case coincides with the CLN, the selector 22 may open the output gate 20 in order to permit the interpolated motion vectors to pass to the output.

By way of another example, if layer L0 is received, layers L1 and L2 are lost, and layer L3 is received, the illustrated recovery module 18 enables reconstruction of the motion vectors for layer L3 from the motion vectors of the last successfully received layer (i.e., layer L0 in this example). More particularly, the decoded layer list 24 would contain the value L0, but not the values L2 or L1. Accordingly, the illustrated selector 22 analyzes the reference layer list 28, the decoded layer list 24, and the recovered layer list 26 to identify the most recent decoded or recovered layer that can be used for motion vector interpolation, In this example, the reference layer list 28 will contain the value L2 because decoded layer L3 refers to layer L2, but the value L2 will not be found in either the decoded layer list 24 or the recovered layer list 26. Additionally, the value L1 will not be found in either the decoded layer list 24 or the recovered layer list 26 because layer L2 was lost as well.

Upon determining that the value L0 is in the decoded layer list 24, the illustrated selector 22 will choose layer L0 as the supporting layer by placing the value L0 on the SLN line 40, and choose layer L1 as the processed layer by placing the value L1 on the PLN line 42. As a result, motion vector coefficients for layer L0 may be transferred from the resize coefficients list 44 to the upsample module 38, which can interpolate from (e.g., upsample) the received coefficients and store the interpolation results to the buffer 14 on line 48 as the intermediate motion vector coefficients for the undecoded layer L1. Of particular note, however, is that the selector 22 may continue to maintain the output gate 20 in the closed state because the PLN (L1) is not equal to the CLN (L3). Simply put, the coefficients for the target motion vector (i.e., layer L3 coefficients) have not yet been obtained, so the iterative process may continue through the set/sequence of enhancement layers until the target motion vectors have been recovered.

The recovered layer list 26 may then be updated by adding the value L1 to the recovered layer list 26. The selector 22 can then designate the layer L1 as the supporting layer and the layer L2 as the processed layer, wherein the above procedure can be repeated in order to interpolate intermediate motion vector coefficients for the undecoded layer L2, The L2 intermediate motion vector coefficients may then be written to the buffer 14 and the value L2 may be added to the recovered layer list. In this example, the described procedure would be repeated once more, with layer L2 being designated as the supporting layer and the layer L3 being designated as the processed layer. In such a case, the interpolated motion vector coefficients for layer L3 would be considered the target motion vector coefficients and written to the buffer 14, Additionally, the selector 22. would determine that the PLN (L3) is equal to the CLN (L3) and may open the output gate 20 in order to permit the target motion vector to pass to the output.

Although the above examples use the immediately preceding layer as the reference layer, other approaches may be used. For example, the following configuration might be encountered in an SVC (scalable video coding, e.g., Recommendation H.264, Advanced video coding for generic audiovisual services, Annex G. ITU-T, 01/2012) stream:

L0 is the base layer sampled at 64 kbit/s, frame size 200×100;

L1 is an enhancement layer sampled at 256 kbit/s, frame size 200×400;

L2 is an enhancement layer sampled at 1024 kbit/s, frame size 200×400; and

L3 is an enhancement layer sampled at 1024 kbit/s, frame size 400×800.

Wherein the reference layers for L1, L2 and L3 are L0, L1 and L1, respectively. As already noted, this information may be extracted by the decoder 16 from the video bitstream and stored in the reference layer list 28.

Figure 3:
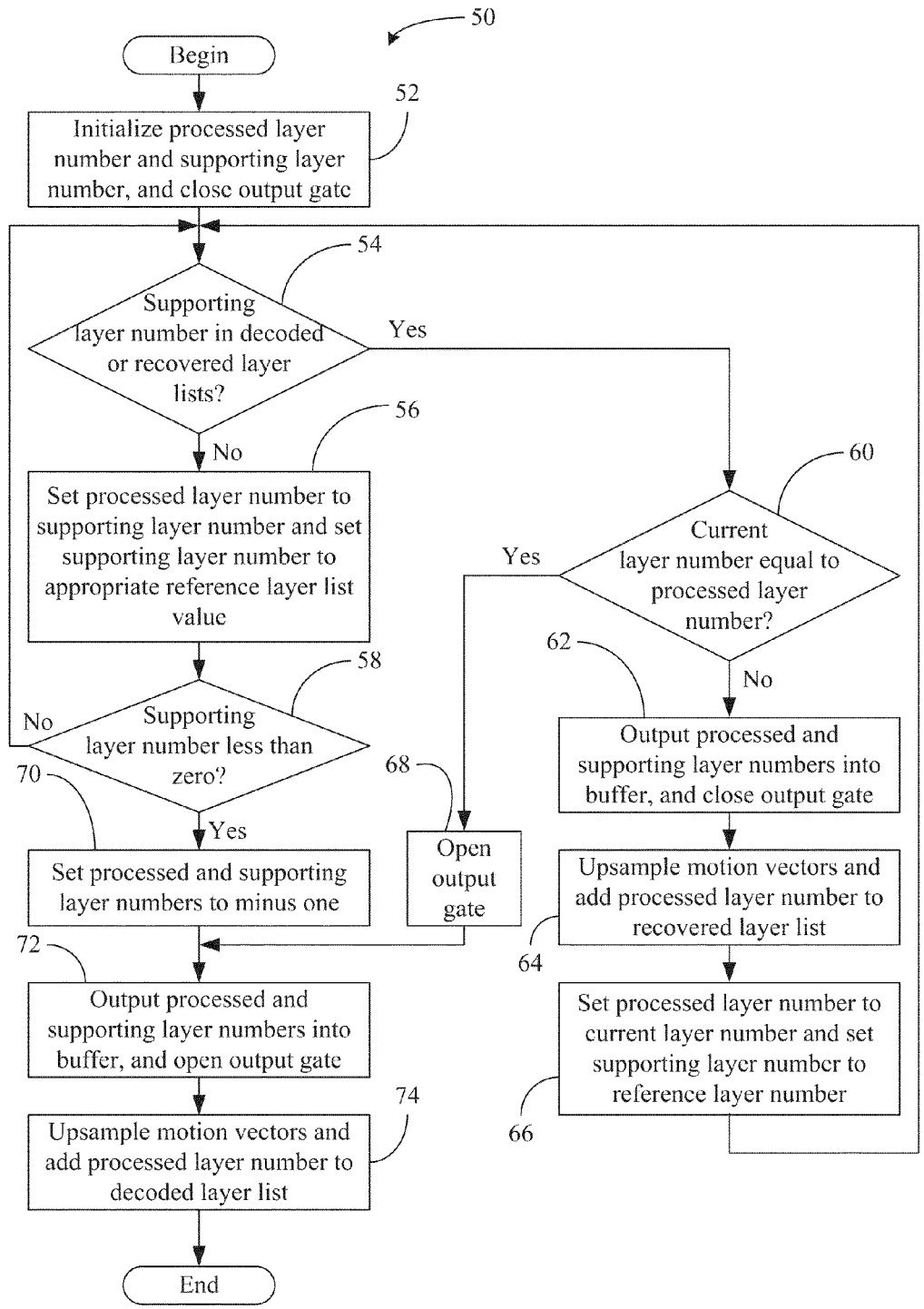
FIG. 3 is a flowchart of an example of a method of processing a decoded video bitstream according to an embodiment.

FIG. 3 shows a method 50 of processing a decoded video bitstream. The method 50 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 50 may be written in any combination of one or more programming languages, including an object oriented programming language such as Java, Smalltalk, C++ or the like and conventional procedural programming languages, such as the "C" programming language or similar programming languages.

Illustrated processing block 52 provides for initializing a processed layer number (PLN), initializing a supporting layer number (SLN) and closing an output gate of a recovery module. More particularly, the processed layer number may be set to the current layer number (CLN, e.g., PLN←CLN) and the supporting layer number may be set to the reference layer number (RLN, e.g., SLN←RLN). Block 54 may determine whether the supporting layer number is in either a decoded layer list or a recovered layer list. if not, motion vector recovery may be appropriate. Accordingly, the processed layer number may be set to the supporting layer number (e.g., PLN←SLN) at block 56. Illustrated block 56 also provides for setting the supporting layer number to the appropriate reference layer list value (RefLL[SLN], e.g., SLN←RefLL[SLN]), wherein the appropriate reference layer list value can be encoded into the video bitstream. For example, if layer L4 references layer L3, layer L3 references layer L1, and layer L2 references layer L1, the RefLL might be populated as follows: RefLL[0]=−1, RefLL[1]=0, RefLL[2]=1, RefLL[3]=1, RefLL[4]=3.

A determination may be made at block 58 as to whether the supporting layer number is less than zero (i.e., base layer has been reached in the iteration). If not, the illustrated process returns to the determination at block 54 as to whether the supporting layer is in either the decoded layer list or the recovered layer list. If the supporting layer is found, block 60 may determine whether the current layer number is equal to the processed layer number (e.g., CLN=PLN). If not, illustrated block 62 outputs the processed layer number and supporting layer numbers to the buffer and maintains the output gate in a closed state. Additionally, the motion vectors of the supporting layer may be upsampled at block 64, which can also provide for adding the processed layer number to the recovered layer list. Block 66 may then set the processed layer number to the current layer number and set the supporting layer number to the reference layer number (e.g., PLN←CLN, SLN←RLN), wherein the process may return to the determination at block 54 as to whether the supporting layer is in either the decoded layer list or the recovered layer list.

If it is determined at block 60 that the current layer number is equal to the processed layer number, the output gate may be opened at block 68 in order to permit the target motion vector to exit the recovery module. If it is determined at block 58 that the supporting layer number is less than zero (e.g., base layer has been reached in the iteration), illustrated block 70 sets the processed and supporting layer numbers to minus one (e.g., PLN←−1, SLN←−1) to halt the search. Accordingly, illustrated block 72 outputs the processed and supporting layer numbers to the buffer, and maintains the output gate in an open state. The motion vectors of the supporting layer may then be upsampled at block 74, which can also added the processed layer number to the decoded layer Turning now to FIG. 4, a modified recovery module 76 of a logic architecture 15 is shown in which an upsample module 78 labels macroblocks associated with recovered motion vectors in a reliability map as unreliable. The illustrated recovery module 76 also includes a correction module 80 configured to correct the unreliable macroblocks. In this regard, the lost data might not be related to an entire level or slice of a frame. Rather, unreliable macroblocks may be surrounded by reliable macroblocks. Accordingly, the illustrated correction module 80 revises the motion vectors of unreliable macroblocks using data related to reliable ones. For example, the correction module 80 may include logic to determine/calculate an average motion vector for a plurality of surrounding reliable macroblocks, determine the difference between the average motion vector and the recovered target motion vector, and assign the average motion vector to the target motion vector if the difference exceeds a threshold value.

FIG. 5A shows a logic architecture 82 that may provide additional stability from the encoder side of the communication channel/link. In general, the logic architecture 82 may be configured to identify macroblocks associated with a video bitstream and select encoding modes for the macroblocks based on an expected recovery error with respect to one or more motion vectors in the macroblocks. In this regard, intra-coding modes may not utilize motion vectors and may be more likely to produce layer recovery errors than inter-coding modes. Accordingly, a greater priority may be given to inter-coding modes than for intra-coding modes.

In the illustrated example, a priority module 84 assigns a priority coefficient to each of a plurality of encoding modes to obtain a corresponding plurality of coefficients based on the expected recovery error. The architecture may also include cost logic 86 to receive macroblocks from a buffer 88 and determine a rate-distortion cost for each of the plurality of encoding modes to obtain a corresponding plurality of rate-distortion costs based on each macroblock. Additionally, the priority module 84 may adjust each rate-distortion cost by a corresponding priority coefficient to obtain a plurality of adjusted rate-distortion costs, wherein optimization logic 90 may identify an optimal value in the plurality of adjusted rate-distortion costs, wherein the selected encoding mode is associated with the optimal value.

In one example, the priority module 84 includes multiplication logic 92 to multiply each rate-distortion cost by a corresponding priority coefficient to obtain the plurality of adjusted rate-distortion costs. Thus, a coefficient greater than one might be assigned to modes that are likely to result in significant error for recovered motion vectors, wherein such a value would increase the cost associated those modes. The architecture 82 may also include a frame buffer 94 that provides frame data to a macroblock encoder-decoder 96, which may in turn use the frame data and mode data from mode control logic 98 to supply the cost logic 86 with the information needed to make the rate-distortion cost determinations.

Figure 6:
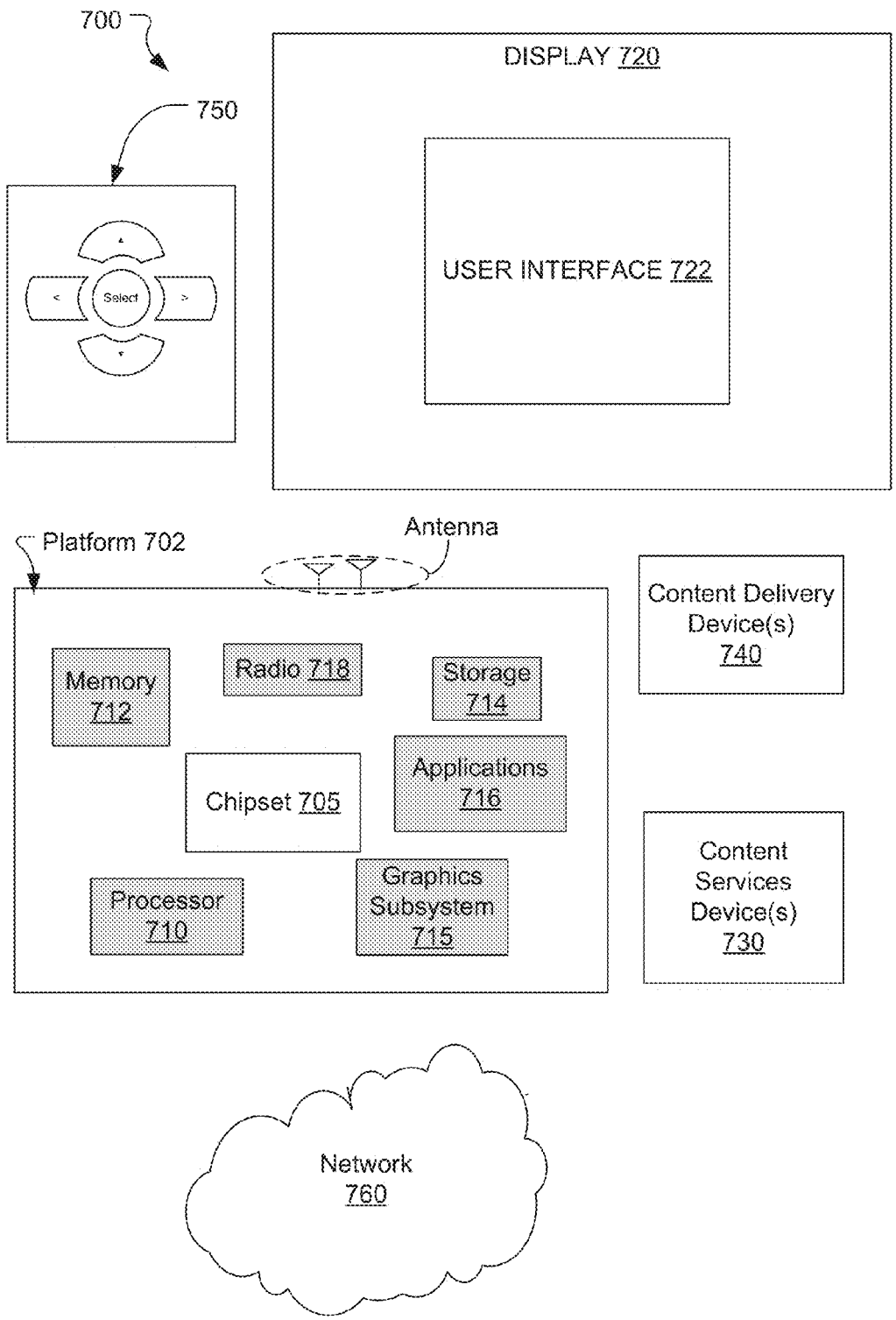
FIG. 6 is a block diagram of an example of a system having a navigation controller according to an embodiment.

FIG. 5B shows a method 100 of selecting encoding modes. The method 100 may be implemented in executable software as a set of logic instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 102 provides for identifying a macroblock associated with a video bitstream. An encoding mode may be selected for the macroblock at block 104 based on an expected recovery error with respect to one or more motion vectors in the macroblock, FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interact device MID), messaging device, data communication device, and so forth. Thus, the system 700 may be used to display video bitstreams as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/ or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced instruction. Set Computer (RISC) processors, x86 instruction set compatible processors, multi-core, or any other microprocessor or central processing unit (CPU). in embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced. protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the logic architecture 13 (FIG. 2), the logic architecture 15 (FIG. 4) and/or the logic architecture 82 (FIG. 5A), already discussed. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch. screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media. information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, tier example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a. network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media. information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant tier an automated system. For example, control information may be used to route media information through a system, or instruct a node to process the media information in a. predetermined manner. The embodiments, however, are not limited to the elements or in the context shown or described in FIG. 6.

Figure 7:
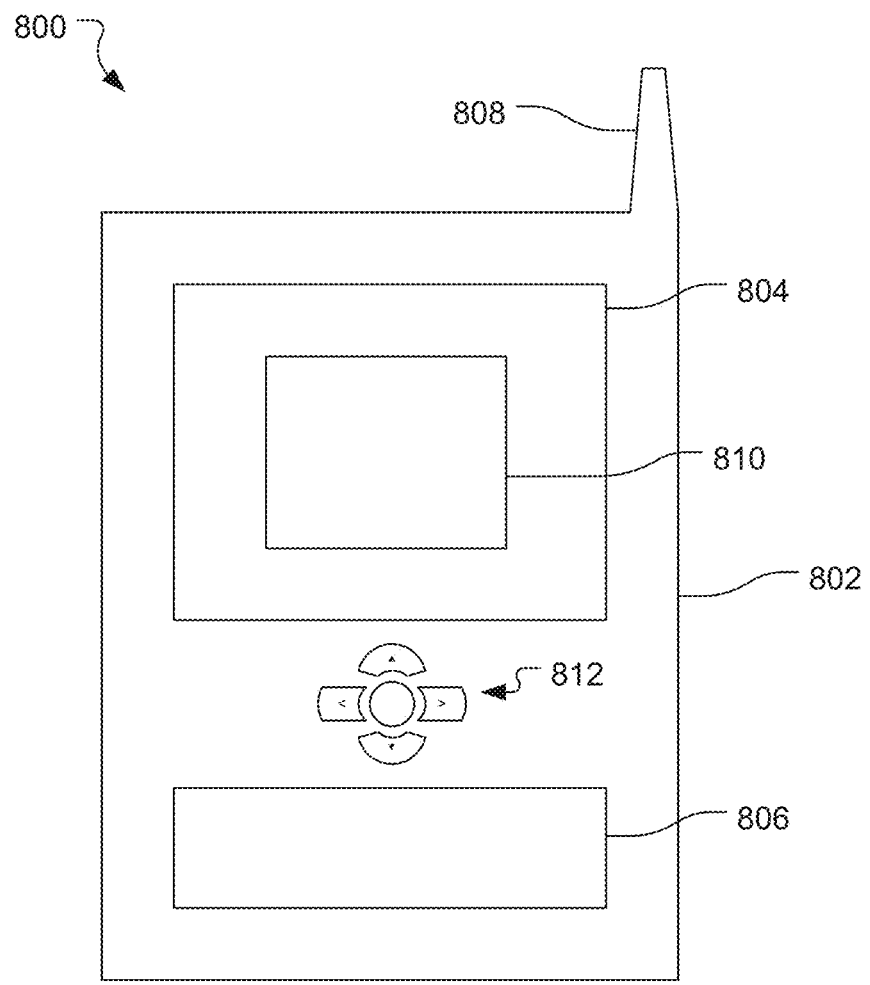
FIG. 7 is a block diagram of an example of a system having a small form factor according to an embodiment.

As described above, system 700 may be embodied in varying physical styles or form factors. FIG. 7 illustrates embodiments of a small form. factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG, 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth, Information also may be entered into device 800 by way of microphone. Such information may be digitized by a voice recognition device. The embodiments are not limited in this context.

Thus, techniques described herein may provide for reconstructing motion vectors for macroblocks referencing data that has not been received due to packet losses in the communication channel. The motion vectors for such macroblocks can be estimated via interpolation from the last available received or reconstructed reference layers. Moreover, motion vector estimates that are obtained via interpolation may be marked as unreliable, wherein nearby reliable motion vectors may be substituted for unreliable motion vectors. Additionally, techniques may also provide a macroblock encoding profile that enables efficient motion vector reconstruction via assignment of a higher priority to motion vector predictions and coding modes that are less critical to packet loss. Similarly, a lower priority may be assigned to motion vector predictions and coding modes when motion vectors cannot be estimated from previously transmitted layers.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same, As manufacturing techniques (e.g., photolithography) mature over time, it is expected that devices of smaller size could be manufactured. In addition, well known power/ground connections to :IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a. method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. in addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   receiving a decoded enhancement layer of a video bitstream, wherein the decoded enhancement layer is associated with a previous layer of the video bitstream, and wherein the previous layer is undecoded due to a packet loss condition with respect to the video bitstream;
   maintaining a list architecture including one or more of a decoded layer list, a recovered layer list and a reference layer list;
   estimating an intermediate motion vector of the previous layer based on a decoded base layer of the video bitstream and the list architecture;
   estimating a target motion vector for the decoded enhancement layer based on the intermediate motion vector and the list architecture; and
   labeling a macroblock associated with the target motion vector in a reliability map as unreliable.

2. The method of claim 1, further including maintaining an upsample output gate in a closed state until the target motion vector has been estimated.

3. The method of claim 1, further including:
   determining an average motion vector for a plurality of surrounding reliable macroblocks;
   determining a difference between the average motion vector and the target motion vector; and
   assigning the average motion vector to the target motion vector when the difference exceeds a threshold value.

4. The method of claim 1, further including estimating a set of intermediate motion vectors, wherein the target motion vector is estimated based on the set of intermediate motion vectors.

5. A system comprising:
   a network controller to obtain a video bitstream;
   a decoder to generate a decoded enhancement layer based on the video bitstream;
   a buffer to receive the decoded enhancement layer, wherein the decoded enhancement layer is to be associated with a previous layer of the video bitstream, and wherein the previous layer is to be undecoded due to a packet loss condition with respect to the video bitstream; and
   a recovery module, implemented at least partly in one or more of configurable logic or fixed functionality logic hardware, to estimate an intermediate motion vector of the previous layer, and to estimate a target motion vector of the decoded enhancement layer based on the intermediate motion vector, wherein the recovery module is to maintain a list architecture including one or more of a decoded layer list, a recovered layer list, and a reference layer list, and wherein the list architecture is to be used to estimate the intermediate motion vector and the target motion vector.

6. The system of claim 5, wherein the recovery module further includes:
   an upsample output gate, and
   a selector to maintain the upsample output gate in a closed state until the target motion vector has been estimated.

7. The system of claim 5, wherein the recovery module is to label a macroblock associated with the target motion vector in a reliability map as unreliable.

8. The system of claim 7, wherein the recovery module further includes a correction module, implemented at least partly in one or more of configurable logic or fixed functionality logic hardware, having logic to determine an average motion vector for a plurality of surrounding reliable macroblocks, determine a difference between the average motion vector and the target motion vector, and assign the average motion vector to the target motion vector when the difference exceeds a threshold value.

9. The system of claim 5, wherein the recovery module is to estimate a set of intermediate motion vectors, wherein the target motion vector is to be estimated based on the set of intermediate motion vectors.

10. The system of claim 5, wherein the intermediate motion vector is to be estimated based on a decoded based layer of the video bitstream.

11. An apparatus comprising:
    a buffer to receive a decoded enhancement layer of a video bitstream, wherein the decoded enhancement layer is to be associated with a previous layer of the video bitstream, and wherein the previous layer is to be undecoded due to a packet loss condition with respect to the video bitsream; and
    a recovery module, implemented at least partly in one or more of configurable logic or fixed functionality logic hardware, to estimate an intermediate motion vector of the previous layer, and to estimate a target motion vector of the decoded enhancement layer based on the intermediate motion vector, wherein the recovery module is to maintain a list architecture including one or more of a decoded layer list, a recovered layer list, and a reference layer list, and wherein the list architecture is to be used to estimate the intermediate motion vector and the target motion vector.

12. The apparatus of claim 11, wherein the recovery module further includes:
    an upsample output gate; and
    a selector to maintain the upsample output gate in a closed state until the target motion vector has been estimated.

13. The apparatus of claim 11, wherein the recovery module is to label a macroblock associated with the target motion vector in a reliability map as unreliable.

14. The apparatus of claim 13, wherein the recovery module further includes a correction module, implemented at least partly in one or more of configurable logic or fixed functionality logic hardware, having logic to determine an average motion vector for a plurality of surrounding reliable macroblocks, determine a difference between the average motion vector and the target motion vector, and assign the average motion vector to the target motion vector when the difference exceeds a threshold value.

15. The apparatus of claim 11, wherein the recovery module is to estimate a set of intermediate motion vectors, wherein the target motion vector is to be estimated based on the set of intermediate motion vectors.

16. The apparatus of claim 11, wherein the intermediate motion vector is to be estimated based on a decoded base layer of the video bitstream.

17. A non-transitory computer readable storage medium comprising a set of instructions which, when executed by a processor, cause a computer to:

receive a decoded enhancement layer of a video bitstream, wherein the decoded enhancement layer is to be associated with a previous layer of the video bitsream, and wherein the previous layer is to be undecoded due to a packet loss condition with respect to the video bitstream;

estimate an intermediate motion vector of the previous layer; and estimate a target motion vector of the decoded enhancement layer based on the intermediate motion vector, wherein the instructions, when executed, cause a computer to maintain a list architecture including one or more of a decoded layer list, a recovered layer list, and a reference layer list, wherein the list architecture is to be used to estimate the intermediate motion vector and the target motion vector.

18. The non-transitory medium of claim 17, wherein the instructions, when executed, cause a computer to maintain an upsample output gate in a closed state until the target motion vector has been estimated.

19. The non-transitory medium of claim 17, wherein the instructions, when executed, cause a computer to label a macroblock associated with the target motion vector in a reliability map as unreliable.

20. The non-transitory medium of claim 19, wherein the instructions, when executed, cause a computer to:

determine an average motion vector for a plurality of surrounding reliable macroblocks;

determine a difference between the average motion vector and the target motion vector; and assign the average motion vector to the target motion vector when the difference exceeds a threshold value.

21. The non-transitory medium of claim 17, wherein the instructions, when executed, cause a computer to, estimate a set of intermediate motion vectors, wherein the target motion vector is to be estimated based on the set of intermediate motion vectors.

22. The non-transitory medium of claim 17, wherein the intermediate motion vector is to be estimated based on a decoded base layer of the video bitstream.

* * * * *

UNITED STATES PATENT AND TRADEMARK OFFICE
CERTIFICATE OF CORRECTION

PATENT NO.        : 10,034,013 B2
APPLICATION NO.   : 13/996001
DATED             : July 24, 2018
INVENTOR(S)       : Eugeniy P. Ovsyannikov et al.

Page 1 of 1

It is certified that error appears in the above-identified patent and that said Letters Patent is hereby corrected as shown below:

In the Claims

At Column 14, Claim number 11, Line number 42, delete "bitsream;" and insert --bitstream;-- therefor At Column 15, Claim number 17, Line number 17, after "of", delete "bitsream," and insert --bitstream,-- therefor Signed and Sealed this
Eleventh Day of December, 2018

Andrei Iancu
*Director of the United States Patent and Trademark Office*